US006105687A

United States Patent [19]

Hansson

[11] Patent Number: 6,105,687

[45] Date of Patent: Aug. 22, 2000

[54] PORTABLE POWER TOOL WITH A POWER SUPPLY LINE SUPPORT DEVICE

[75] Inventor: Gunnar Christer Hansson, Stockholm, Sweden

[73] Assignee: Atlas Copco Tools AB, Nacka, Sweden

[21] Appl. No.: 09/207,530

[22] Filed: Dec. 8, 1998

[30] Foreign Application Priority Data

Dec. 12, 1997 [SE] Sweden .................................. 9704635

[51] Int. Cl.[7] ................................ B23B 45/00; F16L 3/00

[52] U.S. Cl. .......................... 173/217; 173/170; 173/171; 248/52; 439/446; 439/459; 439/470; 227/156

[58] Field of Search .................................... 173/217, 218, 173/171, 168, 169, 170; 81/54; 439/446, 501, 459, 470; 248/51, 52; 191/12 R; 227/156

[56] References Cited

U.S. PATENT DOCUMENTS

| | | | |
|---|---|---|---|
| 1,787,252 | 12/1930 | Jones | 248/52 |
| 2,496,612 | 2/1950 | Wilhide | 248/52 |
| 3,397,749 | 8/1968 | Haskins et al. | 173/218 |
| 3,734,652 | 5/1973 | Barnett | 173/218 |
| 4,395,053 | 7/1983 | Kalfas | 248/52 |
| 4,910,362 | 3/1990 | Kinner | 248/52 |
| 5,180,019 | 1/1993 | Thiry et al. | 173/168 |
| 5,471,013 | 11/1995 | Marchetti | 439/459 |
| 5,730,397 | 3/1998 | Van Niekerk | 248/52 |
| 5,750,932 | 5/1998 | Hansson | 174/113 R |
| 5,924,497 | 7/1999 | Spooner et al. | 173/169 |
| 5,944,263 | 8/1999 | Lucco et al. | 173/171 |

FOREIGN PATENT DOCUMENTS

WO 94/11887 5/1994 WIPO .

*Primary Examiner*—Peter Vo
*Assistant Examiner*—Jim Calve
*Attorney, Agent, or Firm*—Frishauf, Holtz, Goodman, Langer & Chick, P.C.

[57] ABSTRACT

A portable power tool comprises a housing (10), a motor, a handle (11), and a connection device for fixed connection of a terminal end of a flexible power supply line (16), wherein a support device (17) is mounted on the housing (10) for supporting the power supply line (16) at a support point (A) located at a certain distance from the terminal end (15) of the line (16), which support device (17) is swivelled relative to the housing (10) about a first axis (x—x) substantially coinciding with the longitudinal direction of the power supply line (16) at the terminal end (15) of the latter and about a second axis (y—y) extending perpendicularly to the first axis (x—x) as well as to the longitudinal direction of the power supply line (16) in the support point (A). Between its terminal end (15) and its support point (A), the power support line (16) is routed in a free loop (19) large enough to avoid a detrimental sharp bending thereof.

15 Claims, 4 Drawing Sheets

PORTABLE POWER TOOL WITH A POWER SUPPLY LINE SUPPORT DEVICE

BACKGROUND OF THE INVENTION

The invention relates to a portable power tool having a housing with a connection device for connection of a terminal end of a flexible power supply line.

One problem concerned with power tools of this type is that the handling of the tool is impaired by the power supply line, because normally such power supply lines, either in the form of an electric cable or a pressure air hose, are rather stiff as regards bending. This is the case particularly when using an electric cable having several conductors for power supply as well as for signal exchange with an operation control unit located remotely from the tool.

Moreover, electric power tools are usually equipped with cable re-enforcements for distributing the bending strains, i.e. to prevent too small a bending radius of the cable. Such a device is called "bending relief". However, the relief is just for the cable. The tool operator still experiencies negative effects as the cable becomes even stiffer and the handling of the tool becomes even more awkward.

One way of solving the tool handling problem related to power line stiffness is described in PCT-Application WO 94/11887. The power tool described in this publication is an electric angle nutrunner having built-in sensors for delivered torque, angle of rotation etc., and an awkward handling of this tool is avoided by using a flat type cable which is preformed to a twisted shape in a flex zone adjacent the tool. Still, however, the handling of this tool is somewhat uncomfortable, because bending of the cable will always occur at a certain distance from the tool handle. This means that there will always be a resistive torque on the tool caused by the cable weight or other forces acting on the cable. There will also be undesireable dynamic forces on the tool when articulating the cable during handling of the tool.

OBJECT OF THE INVENTION

The object of the invention is to provide an improved power tool handling in which the influence of the physical properties of the power supply line is substantially reduced, and by which premature fatigue of the power supply line is prevented by controlling the bending radius thereof.

Further objects and advantages of the invention will appear from the following specification and claims.

Preferred embodiments of the invention are below described in detail with reference to the accompanying drawings.

DETAILED DESCRIPTION

Figure 1:
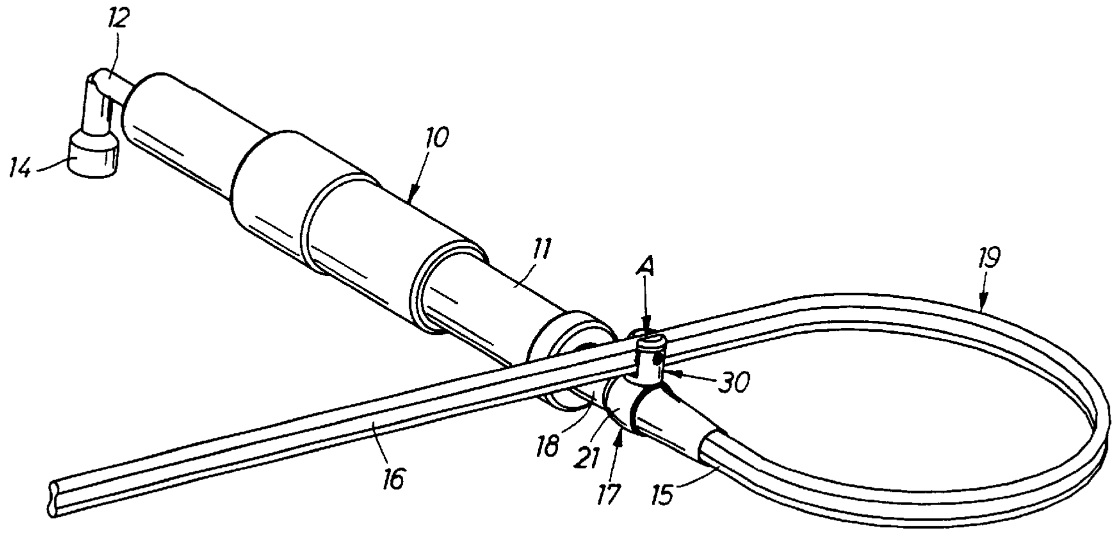
FIG. 1 shows a perspective view of an electric power nutrunner provided with a cable support device according to the invention.
Figure 2:
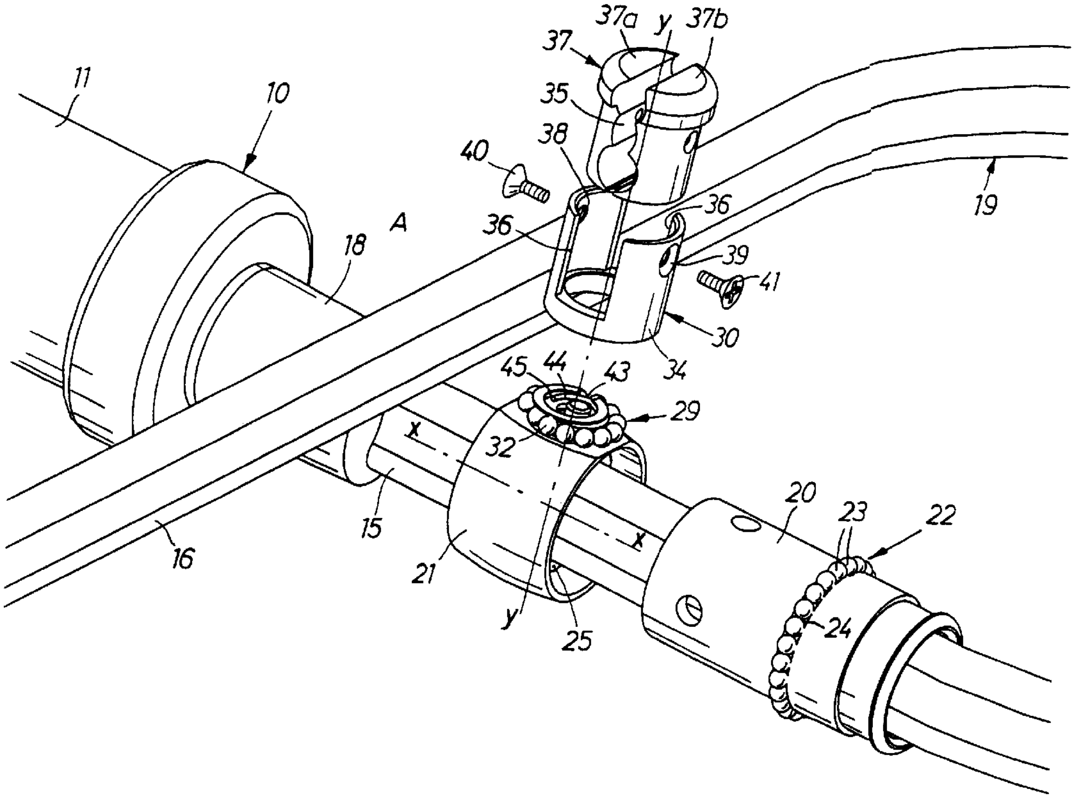
FIG. 2 shows an exploded perspective view of the cable support device of the tool in FIG. 1.
Figure 3:
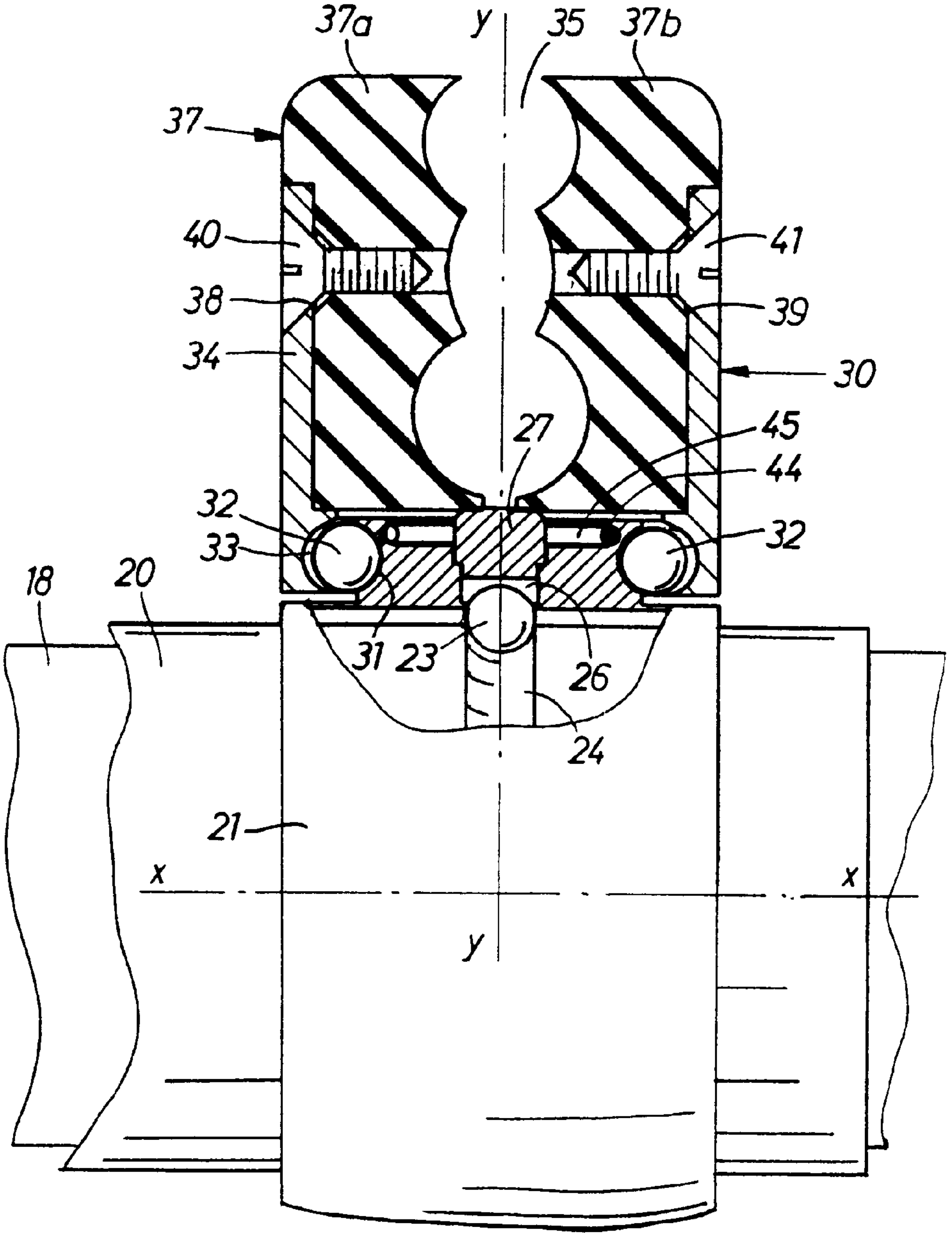
FIG. 3 shows, partly in section, a side view of the cable support device of the tool in FIG. 1.

The power tool illustrated in FIGS. 1–3 is an electric angle type power nutrunner comprising a housing 10, a handle 11 and an angle head 12 with an output shaft (not shown). The output shaft is adapted to carry a screw joint engaging bit or socket 14. The housing 10 is generally tubular in shape, and the handle 11 is formed as a coaxial rear extension of the housing 10. In the handle 11, there is located a connection device (not shown) for connecting the terminal end 15 of a multi-conductor cable 16 by which power is supplied from and electrical signals are exchanged with a remotely located operation control unit (not shown).

The cable 16 is of the flat type described in the above mentioned PCT-Application WO 94/11887. This means that the cable 16 includes three parallel sections, wherein one of the sections contains power conductors only, a second one of the sections contains signal transferring conductors only, and a third one of the section contains no electrical conductors at all and being located between the other two for keeping the sensitive signal conductors spaced from the electrical fields inevitably existing around the power conductors.

A physical property of this type of cable is that it is easy to bend in one direction but difficult to bend in a direction perpendicular to the first direction. In order to improve the handling of the power tool, measures have to be taken to see that the cable is being bent in its weak direction, no matter the actual working position of the tool.

This is achieved by providing the tool with a swivelling and pivoting cable supporting device 17 which is mounted on a rear cylindrical portion 18 of the housing 10 and to which the cable 16 is secured at a point A located at a distance from its terminal end 15. To protect the cable 16 from any hazardous sharp bending, the cable 16 is routed in a free loop 19 between the terminal end 15 and point A. The cylindrical portion 18 carries a tubular sleeve 20 which forms a part of the cable supporting device 17 and which is rigidly secured to the cylindrical portion 18.

The cable supporting device 17 comprises an annular member 21 rotatively journalled on the sleeve 20 by means of a ball bearing 22. The latter includes an inner ball race 24 on the sleeve 20, a number of balls 23, and an outer ball race 25 in the annular member 21. The ball bearing 22 also serves as an axial locking means for the annular member 21 in relation to the sleeve 20.

As illustrated in FIG. 3, the annular member 21 is provided with a radial opening 26 through which the balls 23 are introduced into the annular space formed by the ball races 24, 25 when mounting the annular member 21 on the sleeve 20. The opening 26 is closed by a plug 27 which prevents the balls 22 from falling out during assemblage of the device.

The annular member 21 is provided with a pivot bearing 29 on which a cable retaining unit 30 is rotatively supported. The pivot bearing 29 has a rotation axis which is designated y—y in the drawing figures and which extends perpendicularly to the rotation axis x—x of the annular member 21. The pivot bearing 29 comprises an inner ball race 31 formed integrally with the annular member 21, a number of balls 32, and an outer ball race 33 formed in a tubular socket element 34 forming part of the cable retaining unit 30. The socket element 34 has two axially extending open-ended slots or openings 36, as illustrated in FIG. 2, for receiving the cable 16, and a clamping piece 37 with a cylindrical outer shape, is intended to fit into the socket element 34 with a press fit. The clamping piece 37 is formed of two identical halves **37*a* and 37*b* which are preformed to form together a central slot 35 of a shape similar to the shape of the cable 16, wherein the clamping piece 37 is intended to be mounted in the socket element 34 with the slot 35 coinciding with the openings 36. The slot 35 and the openings 36 form a passageway for the cable 16 through the retaining unit 30**.

The clamping piece halves 37*a*, 37*b* are made of an elastic resilient material like rubber or a rubber like plastic material, such that when they together with the cable 16 are pressed into the socket element 34, a clamping force is applied on the cable 16. Thereby, the cable 16 is frictionally locked against movement relative to the cable supporting device 17.

For locking the clamping piece 37 relative to the socket element 34, the latter is provided with two lateral holes 38, 39 for introduction of two lock screws 40, 41. These screws are of the self-tapping type and are threaded into holes in the clamping piece halves 37*a*, 37*b*, thereby locking the clamping piece 37 against axial movement.

During assembly of the device, the balls 32 are introduced into the space formed by the ball races 31, 33 through an opening 43. See FIG. 3. The balls 32 are prevented from falling out by a circlip 44 mounted in a circular recess 45 in the annular member 21.

By offering a freedom by swivelling about two perpendicular axes, the above described cable support device 17 provides a comfortable handling of the power tool without any heavy influence of bending forces on the cable 16. The movable support in combination with a routing of the cable 16 in a free loop between the terminal end of the cable and the support point results in an effective relief of the cable 16 as regards too a sharp bending.

Figure 4:
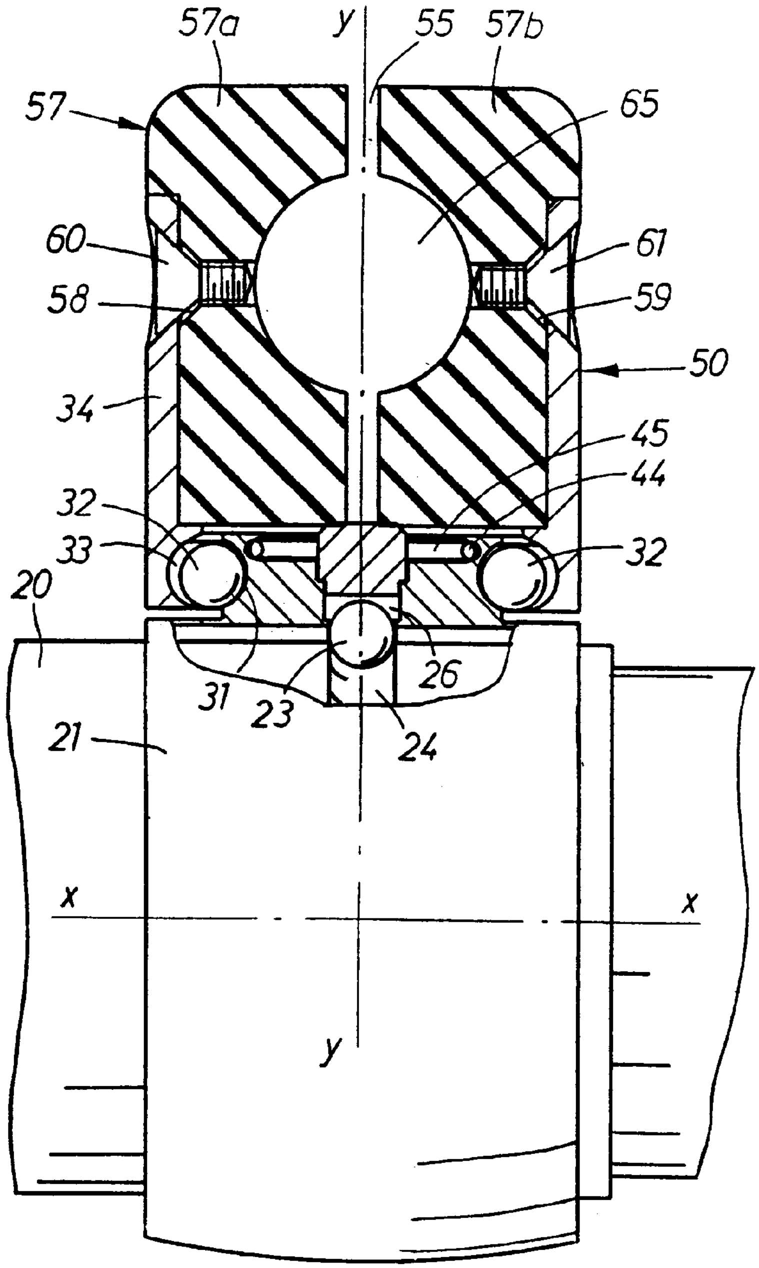
FIG. 4 shows, partly in section, a power line support device according to an alternative embodiment of the invention.

As illustrated in FIG. 4, the power line support device 17 may very well be adapted to a pneumatic power tool and to the pressure air hose connected thereto. In this embodiment, the power line support device 17 comprises a retaining unit 50 with a clamping piece 57 formed by two halves 57*a* and 57*b* which together form a central slot 55 and an aperture 65. The latter has a substantially circular cross section and is intended to form a friction grip around the pressure air hose (not shown). The clamping piece halves 57*a*, 57*b* are locked relative to the socket element 34 by two lock screws 60, 61 inserted through two lateral holes 58, 59 in the socket element 34. As in the above described embodiment, the screws 60, 61 are self-tapping in relation to the clamping piece 57.

The operation of the pressure air hose embodiment of the invention is the same as for the electric cable embodiment and offers the same advantages as regards improved handling of the power tool.

It is to be noted that the embodiments of the invention are not limited to the above described examples, but can be freely varied within the scope of the claims. For instance, the invention is not limited to power nutrunners, but can be used in connection with other types of tools where stiff power supply lines are used.

What is claimed is:

1. A portable power tool comprising a housing, a motor located in said housing, and a connection device mounted on said housing for receiving a terminal end of a flexible power supply line, wherein:

a support device for supporting said power line relative to said housing is provided on said housing at a support point located at a certain distance from said terminal end of said power supply line;

said support device comprises a clamping device for firmly securing said power supply line relative to said support device at said support point;

said support device and said clamping device are freely swivellable at said support point relative to said housing both about a first axis substantially coinciding with a longitudinal direction of said power supply line at said terminal end of said power supply line and about a second axis perpendicular both to said first axis and to the longitudinal direction of said power supply line at said support point; and said power supply line is routed in a free loop between said terminal end of said power supply line and said clamping device at said support point.

2. The power tool according to claim 1, wherein:

said housing comprises a cylindrical portion, said support device comprises an annular member journalled on said cylindrical portion for unlimited free rotation thereon, and said annular member is provided with a pivot bearing having an axis extending along said second axis and extending radially relative to said annular member; and said clamping device is journalled on said pivot bearing for unlimited free rotation relative to said annular member.

3. The power tool according to claim 2, wherein said clamping device comprises a tubular socket element rotatable about its geometric axis and provided with two diametrically opposed openings, and a cylindrical clamping piece received in said socket element and provided with a transverse aperture coinciding with said openings for receiving said power supply line.

4. The power tool according to claim 3, wherein said housing is provided with a handle, and said cylindrical portion of said housing is formed as a tubular extension of said handle.

5. The power tool according to claim 4, wherein said motor comprises an electric motor, said power supply line comprises a flat type electric cable having a small transverse dimension and a large transverse dimension, and said cable is oriented with said large transverse dimension in parallel with said second axis at said support point.

6. The power tool according to claim 4, wherein said motor comprises a pneumatic motor, and said power supply line comprises pressure air conduit.

7. The power tool according to claim 3, wherein said motor comprises an electric motor, said power supply line comprises a flat type electric cable having a small transverse dimension and a large transverse dimension, and said cable is oriented with said large transverse dimension in parallel with said second axis at said support point.

8. The power tool according to claim 3, wherein said motor comprises a pneumatic motor, and said power supply line comprises pressure air conduit.

9. The power tool according to claim 2, wherein said housing is provided with a handle, and said cylindrical portion of said housing is formed as a tubular extension of said handle.

10. The power tool according to claim 9, wherein said motor comprises an electric motor, said power supply line comprises a flat type electric cable having a small transverse dimension and a large transverse dimension, and said cable is oriented with said large transverse dimension in parallel with said second axis at said support point.

11. The power tool according to claim 9, wherein said motor comprises a pneumatic motor, and said power supply line comprises pressure air conduit.

12. The power tool according to claim 2, wherein said motor comprises an electric motor, said power supply line comprises a flat type electric cable having a small transverse dimension and a large transverse dimension, and said cable is oriented with said large transverse dimension in parallel with said second axis at said support point.

13. The power tool according to claim 2, wherein said motor comprises a pneumatic motor, and said power supply line comprises pressure air conduit.

14. The power tool according to claim 1, wherein said motor comprises an electric motor, said power supply line comprises a flat type electric cable having a small transverse dimension and a large transverse dimension, and said cable is oriented with said large transverse dimension in parallel with said second axis at said support point.

15. The power tool according to claim 1, wherein said motor comprises a pneumatic motor, and said power supply line comprises pressure air conduit.

* * * * *